United States Patent
Kawasaki et al.

(10) Patent No.: US 7,711,249 B2
(45) Date of Patent: May 4, 2010

(54) RECORDING/REPRODUCTION DEVICE AND METHOD

(75) Inventors: Kojiro Kawasaki, Katano (JP); Hiroyuki Kondo, Kyoto (JP); Masahiro Horie, Kuga-gun (JP)

(73) Assignee: Panasonic Corporation, Osaka (JP)

( * ) Notice: Subject to any disclaimer, the term of this patent is extended or adjusted under 35 U.S.C. 154(b) by 1093 days.

(21) Appl. No.: 10/533,585

(22) PCT Filed: Nov. 10, 2003

(86) PCT No.: PCT/JP03/14237

§ 371 (c)(1),
(2), (4) Date: Jan. 11, 2006

(87) PCT Pub. No.: WO2004/045207

PCT Pub. Date: May 27, 2004

(65) Prior Publication Data

US 2006/0140219 A1    Jun. 29, 2006

(30) Foreign Application Priority Data

Nov. 12, 2002  (JP)  ............................. 2002-328045

(51) Int. Cl.
*H04N 5/91* (2006.01)
(52) U.S. Cl. .......................................... 386/98; 386/52
(58) Field of Classification Search .................... 386/98
See application file for complete search history.

(56) References Cited

U.S. PATENT DOCUMENTS

| | | | | |
|---|---|---|---|---|
| 5,913,013 A | * | 6/1999 | Abecassis | .................... 386/125 |
| 6,567,979 B1 | * | 5/2003 | deCarmo | ..................... 725/25 |

| | | | |
|---|---|---|---|
| 2001/0010664 A1 | 8/2001 | Ando et al. | |
| 2001/0010671 A1 | 8/2001 | Ando et al. | |
| 2002/0024892 A1 | 2/2002 | Ando et al. | |
| 2002/0039480 A1 | 4/2002 | Ando et al. | |

FOREIGN PATENT DOCUMENTS

| | | |
|---|---|---|
| EP | 1 286 544 | 2/2003 |
| JP | 2001-218143 | 8/2001 |
| JP | 2001-326888 | 11/2001 |
| JP | 2002-44608 | 2/2002 |
| JP | 2002-56651 | 2/2002 |
| JP | 2002-171485 | 6/2002 |
| JP | 2002-197808 | 7/2002 |
| WO | 00/49803 | 8/2000 |
| WO | 01/82609 | 11/2001 |

* cited by examiner

*Primary Examiner*—Marsha D Banks Harold
*Assistant Examiner*—Daniel Tekle
(74) *Attorney, Agent, or Firm*—Wenderoth, Lind & Ponack, L.L.P.

(57) ABSTRACT

When a digital broadcast is decoded and then re-encoded and digitally recorded, detailed program information contained in the original digital broadcast and information such as age-based viewer control information or parental control information may be lost. This problem is solved by providing a digital tuner to demodulate the digital broadcast signal and output the MPEG-TS, a demultiplexer to demultiplex the MPEG-TS into the component packet streams, an AV decoder to decode the demultiplexed AV data packets, and an AV encoder to re-encode the demultiplexed AV data packets into AV data packets for recording. A control microprocessor reads, reconstructs, and sends the PSI or SI packets demultiplexed by the demultiplexer to save the viewer control information to the system multiplexer. The system multiplexer multiplexes the PSI or SI packets with the re-encoded AV data packets, and the multiplexed stream is then written to the recording medium.

18 Claims, 8 Drawing Sheets

RECORDING/REPRODUCTION DEVICE AND METHOD

TECHNICAL FIELD

The present invention relates to a digital broadcast reception system, and relates more particularly to a digital broadcast reception system with a digital information recording and playback function. More specifically, the present invention relates to a recording and playback apparatus and method, to a program for implementing the recording and playback method, and to a data recording medium for recording this program.

BACKGROUND ART

Digital broadcasting services using broadcast satellites and communication satellites have now started, and demand for digital recording and playback devices enabling time-shift viewing of digital broadcasts is growing. Existing digital recording and playback systems such as taught in Japanese Unexamined Patent Appl. Pub. 2001-218143 filter and extract the desired program from the broadcast stream for recording. Referred to as simply a "digital recorder" below, this conventional digital recording and playback device is described next.

Figure 8:
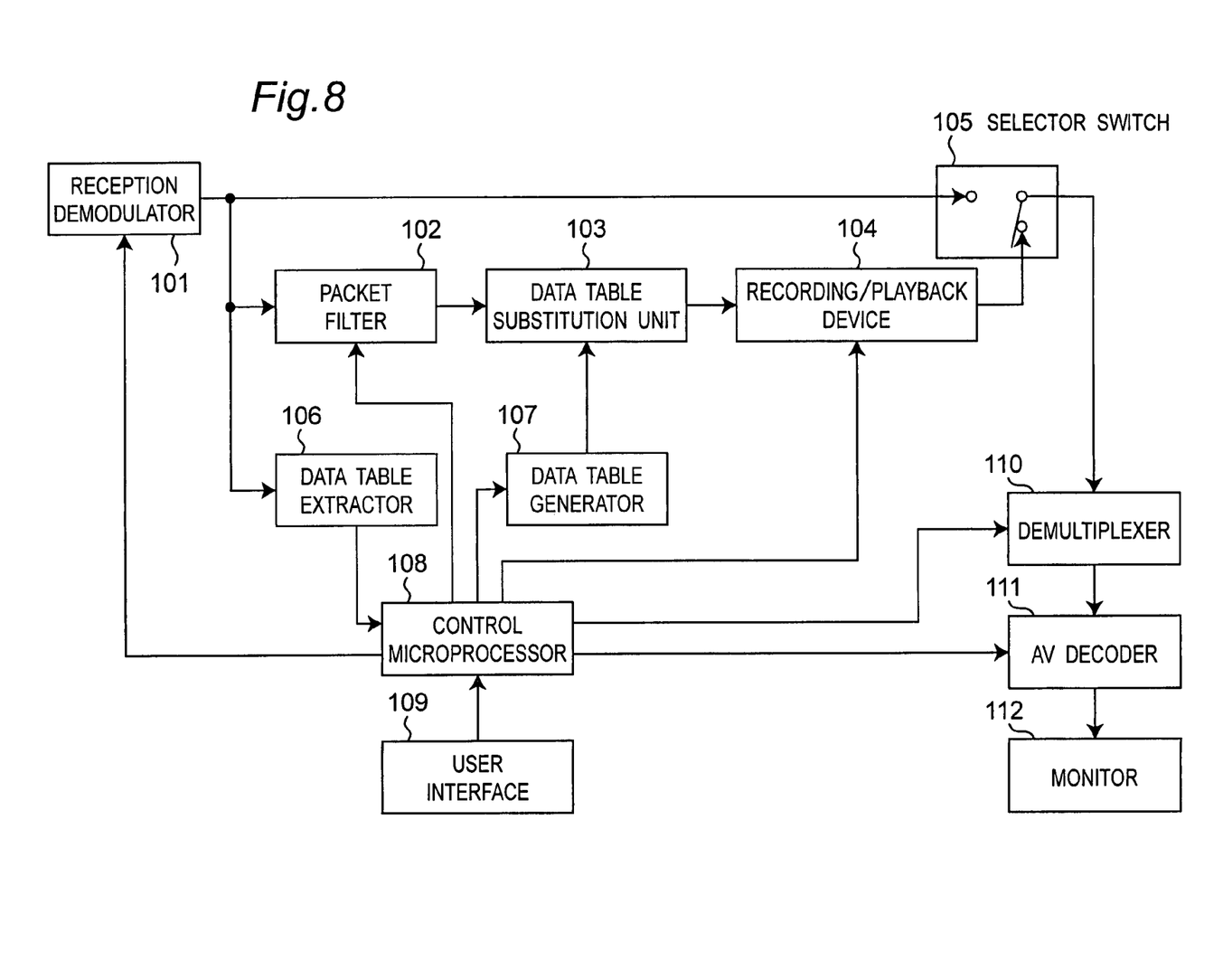
FIG. 8 is a block diagram of a conventional recording/playback apparatus.

FIG. 8 is a block diagram showing a conventional digital broadcast reception system having a recording/playback function as taught in Japanese Unexamined Patent Appl. Pub. 2001-218143.

As shown in FIG. 8, the output of the reception demodulator 101 is connected to the input to packet filter 102, one input to the selector switch 105, and the input to the data table extractor 106. The output of the packet filter 102 is connected to the input to the data table substitution unit 103. The output of the data table substitution unit 103 is connected to the input to the recording/playback device 104. The output of the recording/playback device 104 is connected to the other input to the selector switch 105. The output of the data table extractor 106 is connected to an input to the control microprocessor 108. The outputs of the control microprocessor 108 are connected to the reception demodulator 101, packet filter 102, data table generator 107, recording/playback device 104, demultiplexer 110, and AV decoder 111. The output of the data table generator 107 is connected to the input to the data table substitution unit 103. The output of the selector switch 105 is connected to the input to the demultiplexer 110. The output of the demultiplexer 110 is connected to the input to the AV decoder 111. The output of the AV decoder 111 is connected to the input to the monitor 112. The output of the user interface 109 is connected to an input to the control microprocessor 108.

Operation of this conventional digital broadcast reception system with a recording/playback function is described next.

The control microprocessor 108 first sets the selector switch 105 to the reception demodulator 101 side. The reception demodulator 101 demodulates the received digital broadcast signal, and outputs an MPEG-TS (MPEG transport stream) packet stream. This packet stream contains packets for carrying program video data and audio data ("AV transport packets" below), and packets for carrying data tables ("data table transport packets" below). The demultiplexer 110 and AV decoder 111 process the packet stream as instructed by the control microprocessor 108, and construct an electronic program guide (EPG) transmitted from the broadcast station at that time into a format that can be processed by the control microprocessor 108. The electronic program guide can then be presented to the user as graphical information displayed on the monitor 112, or through the user interface 109.

The user then refers to the presented program guide and selects the program desired for recording from among the multiple program options. The selected program is not limited to programs currently being broadcast, and could be a program scheduled for future broadcasting. When a program scheduled for future broadcasting is to be recorded and the control microprocessor 108 knows what the current time is, the control microprocessor 108 executes an operation such as described below when the scheduled broadcasting time comes.

This program recording operation is described next. Using the user interface 109, the user tells the control microprocessor 108 what program to record by, for example, specifying the program number. These program numbers are one of the fields in the program guide data table, which includes program broadcast times and the program matrix, and the control microprocessor 108 can therefore use the program_number to identify a unique program.

The packet stream output from the reception demodulator 101 at this time is input to the packet filter 102 and data table extractor 106. The data table extractor 106 extracts and inputs the data tables from the input packet stream to the control microprocessor 108. The control microprocessor 108 determines if the program to record is currently being broadcast based on the input data table. This specific operation is described next.

First, the control microprocessor 108 references the event information section of the Event Information Table (EIT) containing detailed information about each program to find the program_number and identify the program. The control microprocessor 108 then reads the running_status value for that program in the Event Information Table, and thus determines if the recording program is currently being broadcast. If the recording program selected by the user is a program scheduled for future broadcasting, then several seconds to several minutes before the program is to start the control microprocessor 108 confirms whether the selected program will be broadcast as scheduled to both ensure that the program will be recorded from the beginning and prevent recording errors.

If transmission of the scheduled recording program is confirmed, the control microprocessor 108 sends the PID value of the packets to be passed to the packet filter 102. This PID value is the PID of the packets carrying video data for the recording program, the PID of the packets carrying the audio data for the recording program, the PID of the packets carrying other program related information as instructed, and the PID of the packets carrying the PSI (Program Specific Information) table containing information about the packets belonging to each program contained in the stream. Packets (such as null packets) identified as not needing recording do not need to pass the packet filter 102, and the PID for those packets is therefore not passed by the control microprocessor 108 to the packet filter 102. If the recording capacity of the recording medium used by the recording/playback device 104 is sufficient, the packet filter 102 could also be told to pass video data and other information relating to programs other than the recording program. If the video data carrier packets contain multiple hierarchically coded video packets, this will be indicated in the PMT (Program Map Table), and the control microprocessor 108 can therefore determine whether to control multiple video streams as instructed by the user.

The filtering operation of the packet filter 102 results in dropped packets in the packet stream. The content of the PSI table when it is output from the reception demodulator 101 therefore does not match the new packet stream output from the packet filter 102. The data table generator 107 therefore generates a new PSI table corresponding to the new packet stream as instructed by the control microprocessor 108. Multiple programs are contained in the packet stream from the reception demodulator 101, and this applies to when only one of those programs is to be recorded.

It should be noted that the Network Information Table (NIT) is optional according to the MPEG standard, and it is therefore not always necessary to pass and record the Network Information Table through the packet filter 102. Even if the Network Information Table is filtered by the packet filter 102, the lack of the Network Information Table has little effect on other devices. However, the data table generator 107 could include the program_number 0, that is, the Network Information Table, in the recording program information, and the Network Information Table could be inserted to the packet stream by the data table substitution unit 103. This affords compatibility with digital information processes that require the Network Information Table.

The new PSI table generated by the data table generator 107 is input to the data table substitution unit 103, and thereby substituted for the PSI table contained in the packet stream that passed the packet filter 102. This assures that the PSI table matches the packet stream output from the packet filter 102. In addition, data for descriptors relating to programs other than the recording program is deleted from the new Program Association Table (PAT), and the total amount of data in the packet stream is therefore compressed. The number of packet is also reduced as a result deleting descriptor data.

The transport packets contain a continuity_counter that increment one in each of plural packets having the same PID value. When packet dropping occurs as noted above, this continuity_counter is controlled by the data table generator 107 so that the appropriate value is assigned to each packet.

The new packet stream thus generated is sent to the recording/playback device 104 and recorded to a data storage medium in the recording/playback device 104. A separate index area is provided from the area for continuously recording the stream, and the recorded program can be played back by recording where the program was recorded to the recording medium (i.e., the address information) in this index area.

If the recording medium is a fixed disk medium or semiconductor memory, this index area can be anywhere outside the continuous recording area to which the program data is recorded. If the recording medium is a tape medium, the index area is any area (such as the beginning of the tape) outside the contiguous program data storage area, including an electronic memory device built in to the tape cassette of a digital video cassette. Furthermore, if a tape medium is used, random access performance can be improved with the tape by repeatedly recording the program address information between program data segments using a data format that can be easily distinguished from the transport packets carrying the program data.

Because this recording operation is done without using the signal lines connecting the reception demodulator 101, selector switch 105, and demultiplexer 110, the desired programs can be recorded while the user is viewing a different program. In order to process multiple programs received over different channels, however, the reception demodulator 101 must be able to process multiple streams received through multiple transponders. As a result, the reception demodulator 101 must therefore have a multichannel reception capability and a distribution function for distributing the multiple transponder streams to the data table extractor 106 and demultiplexer 110 sides.

The operation for playing the recorded program back is described next. When a program is recorded as instructed by the user, the control microprocessor 108 updates the list of recorded programs graphically displayed on the monitor 112, for example. The user can then view this list to select the recorded program for playback.

The user then uses the user interface 109 to tell the control microprocessor 108 which program to play back. The control microprocessor 108 then refers to the program data address information written to the index area, and starts to read the desired program data from the storage medium of the recording/playback device 104. The control microprocessor 108 also switches the selector switch 105 to the recording/playback device 104 side. The playback stream read from the storage medium thus passes the selector switch 105 and is sent to the demultiplexer 110 and AV decoder 111. The control microprocessor 108 controls the demultiplexer 110 and AV decoder 111 to present the reproduced program on the monitor 112.

The digital information passed to the demultiplexer 110 during program playback includes such program information as the PSI table and the video and audio data, but does not include the electronic program guide and other related information. When compatibility with other systems that process this related information with the program information during normal digital broadcast reception is considered, the control microprocessor 108 stops processing this related information other than the program information during playback of a recorded program so that dropping this related information does not create a problem with system operation.

By thus providing a mechanism for replacing the PSI table, this conventional digital broadcast reception system can record only the desired programs to a recording/playback device while maintaining full MPEG compatibility, and the recording efficiency of the recording/playback device 104 can thus be maintained as more fully described in Japanese Unexamined Patent Appl. Pub. 2001-218143.

While the prior art thus increases the recording efficiency by replacing only the packets for data table transfer, and reconstructing and recording the desired program from a broadcast packet stream containing multiple programs to a recording/playback drive, the AV data packets that predominately control the recording efficiency are simply recycled directly from the original packet stream.

Digital broadcasts also carry program rating data inserted to the broadcast packet stream so that a parental control system enabling program viewing to be controlled according to the viewer's age, or more specifically the program ratings. This rating system works in conjunction with the receiver. It is therefore desirable for this parent control system to also work when playing back programs recorded from such a broadcast. However, decoding digital broadcasts and then re-encoding the program for digital recording often loses detailed program information, including this parental control information, contained in the original digital broadcast.

DISCLOSURE OF INVENTION

The present invention is therefore directed to solving the foregoing problems by providing a recording and playback apparatus for recording a packet stream containing AV transport packets and data table packets for managing the AV transport packets. This recording and playback apparatus has a demultiplexer for demultiplexing a first packet stream into AV transport packets and data table packets; an AV decoder for decoding the AV transport packets and outputting AV data; an AV encoder for encoding the AV data and outputting second AV transport packets; a data table packet generator for constructing second data table packets for managing the second AV transport packets based on the data table packets; and a multiplexer for multiplexing the second AV transport packets and second data table packets, and outputting a second packet stream. Thus comprised, even when the packet stream is decoded and then re-encoded, management information contained in the data table packets of the original packet stream is retained in the re-encoded packet stream.

The recording/playback apparatus of this invention preferably also has a digital tuner for receiving and demodulating digital broadcasts; and a storage controller for recording the first packet stream or second packet stream. The first packet stream or the second packet stream stored in the storage controller is input to the demultiplexer. Either the packet stream carried in the digital broadcast, or the packet stream recorded by the storage controller is thus input to the demultiplexer, and the management information contained in the data table packets in the digital broadcast can be included in the data table packets of the re-encoded packet stream.

Yet further preferably, a data table packet generator of this recording/playback apparatus writes copying control information or viewer control information (parental control information) contained in the first packet stream in the management information for the second data table packets or second AV transport packets. If copy control information or viewer control information is contained in the digital broadcast, this information can thus be included in the re-encoded packet stream.

Yet further preferably, the recording/playback apparatus of this invention also has a program table data processor for collecting program information from the first packet stream or packet stream stored by the storage controller, and generating a program table; and a user interface unit for receiving user input. The demultiplexer outputs the AV transport packets and data table packets for a program selected from the user interface unit. The program to be re-encoded can thus be selected according to the generated program table.

Based on input from the user interface unit, the storage controller of this recording and reproducing apparatus records the first packet stream or second packet stream. The packet stream output from the digital tuner, and the re-encoded packet stream, can thus be selectively recorded.

Yet further preferably, the AV encoder of the recording/playback apparatus of this invention sets the compression rate based on input from the user interface unit. This enables the user to set the compression rate used by the AV encoder.

A recording and reproducing method according to the present invention for recording a packet stream containing AV transport packets and data table packets for managing the AV transport packets has: a first step for demultiplexing a first packet stream into AV transport packets and data table packets; a second step for decoding the AV transport packets and outputting AV data; a third step for encoding the AV data and outputting second AV transport packets; a fourth step for constructing second data table packets for managing the second AV transport packets based on the data table packets; and a fifth step for multiplexing the second AV transport packets and second data table packets, and outputting a second packet stream.

Further preferably, this recording and reproducing method also has a sixth step for receiving and demodulating digital broadcasts, a seventh step for determining a recording program to be recorded from the digital broadcast received in the sixth step, and the first step demultiplexes the packet stream of the recording program determined in the seventh step into AV transport packets and data table packets.

When a digital broadcast is decoded and then re-encoded and recorded to a recording medium, the recording/playback apparatus of the present invention can also save program information contained in the original broadcast, including such viewer control information as parental rating information.

In addition, this recording/playback apparatus can lower the resolution during re-encoding to increase recording efficiency.

Furthermore, viewer control, including parental control, conforming to the viewer age restrictions of the original broadcast can be used when playing back the program thus re-encoded and recorded.

Program content can also be referenced and viewed automatically or when requested by the user during playback.

Other objects and attainments together with a fuller understanding of the invention will become apparent and appreciated by referring to the following description and claims taken in conjunction with the accompanying drawings.

BEST MODE FOR CARRYING OUT THE INVENTION

Figure 1:
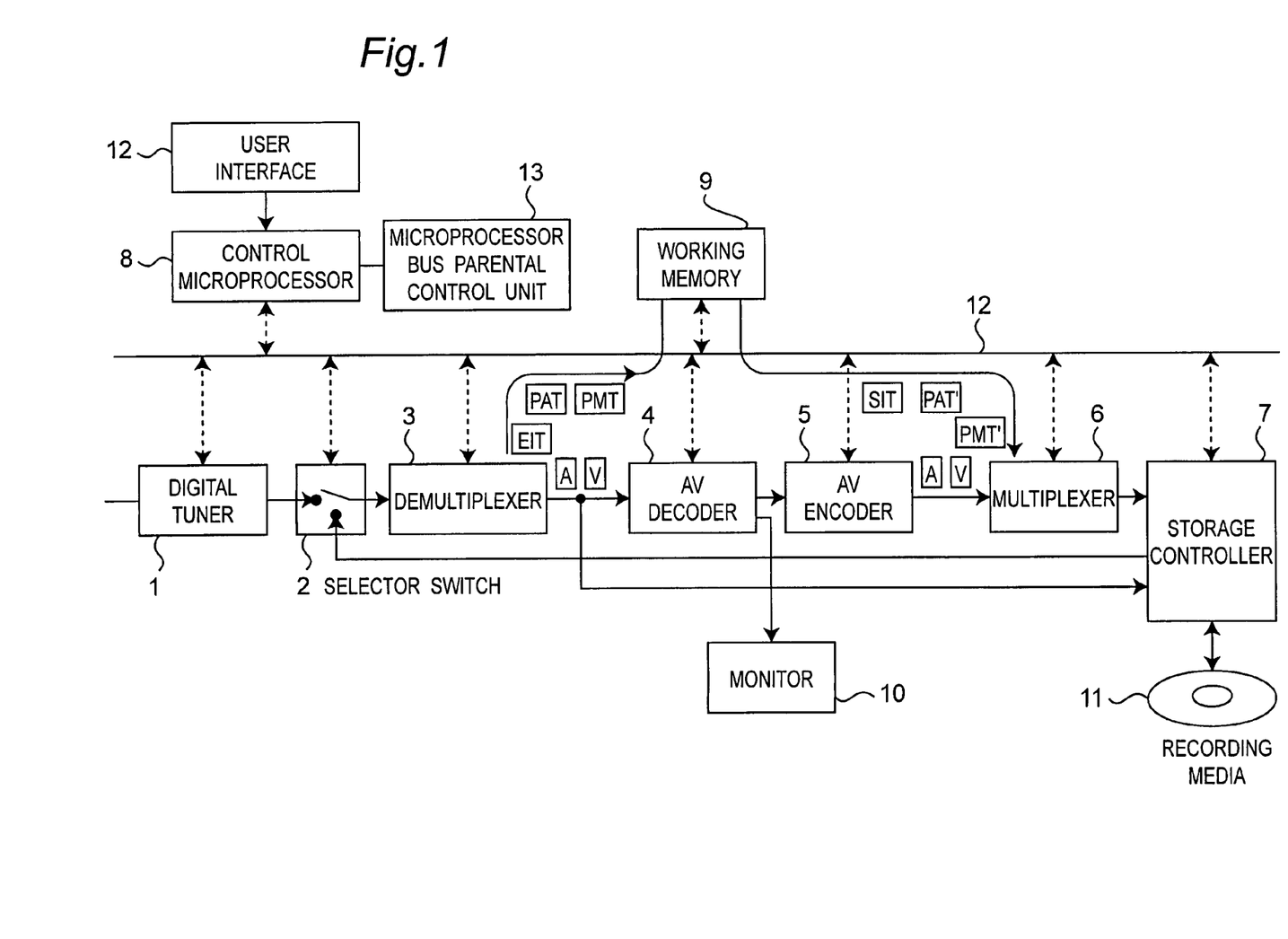
FIG. 1 is a block diagram of a recording/playback apparatus according to a first embodiment of the present invention.

FIG. 1 is a block diagram of a recording/playback apparatus according to a first embodiment of the present invention. As shown in FIG. 1, the output of the digital tuner 1 is connected to a first input to the selector switch 2. The output of the selector switch 2 is connected to the input to the demultiplexer 3. The output of the demultiplexer 3 is connected to the input to the AV decoder 4 and the input to the storage controller 7. The first output from the AV decoder 4 is connected to the input to the AV encoder 5, and the second output from the AV decoder 4 is connected to the input to the monitor 10. The output of the AV encoder 5 is connected to the input to the multiplexer 6. The output of the multiplexer 6 is connected to the input to the storage controller 7. The first output of the storage controller 7 is connected to the input to the recording media 11, and the second output of the storage controller 7 is connected to the second input to the selector switch 2. The control microprocessor 8 is connected via the microprocessor bus to the working memory 9 and other circuit blocks. The output of the user interface 12 is connected to an input to the control microprocessor 8. A parental control unit 13 for entering viewer age information is connected to the control microprocessor 8 so that a parental control function for restricting program viewing based on a parental control rating (such as the viewer age) can be implemented. Note that dotted lines in FIG. 1 indicate control by the control microprocessor 8.

The recording operation of this recording/playback apparatus according to the first embodiment of the invention is described next below. The control microprocessor 8 first sets the selector switch 2 to the first input side to receive input from the digital tuner 1. The digital tuner 1 demodulates the received digital broadcast signal and outputs an MPEG-TS packet stream. The packet stream includes AV transport packets carrying the program video data and audio data, and data table transport packets carrying different data tables. The AV transport packets contain audio signal A and video signal V. The data table transport packets contain the Program Association Table (PAT), Program Map Table (PMT), and Event Information Table (EIT).

The packet stream passed from the selector switch 2 is demultiplexed by the demultiplexer 3 into the AV transport packets and data table transport packets relating to the program previously selected by the user via the user interface 12. The audio and video signals from the AV transport packets are sent to the AV decoder 4, and the data table transport packets (PAT, PMT, EIT) are sent to working memory 9 and controlled by the control microprocessor 8.

The AV decoder 4 outputs the AV data decoded from the input AV transport packets to the AV encoder 5. The AV decoder 4 simultaneously outputs the decoded video to the monitor 10 for immediate on-air viewing. Different output terminals are used to output from the AV decoder 4 to the AV encoder 5 and monitor 10. Using separate output terminals enables an HDTV broadcast to be viewed while it is being broadcast (that is, output to the monitor 10) in the HDTV format, while being simultaneously recorded (that is, output to the AV encoder 5) either in the HDTV format or in the lower resolution conventional format. The AV decoder 4 could have only one output terminal for outputting to the AV encoder 5 and monitor 10, but in this case the program will be recorded in the same resolution used for viewing.

The AV encoder 5 encodes the supplied AV data to an MPEG-TS elementary stream, and outputs the AV transport packets (A, V) to the multiplexer 6. The user interface 12 can be used at this time to adjust the compression rate of the encoding operation. The compression rate is set by the control microprocessor 8 in the AV encoder 5.

The control microprocessor 8 and working memory 9 together form a data table packet generator for generating the data table packets corresponding to the AV transport packets output from the AV encoder 5. The data table transport packets (PAT, PMT, EIT) demultiplexed by the demultiplexer 3 and stored in working memory 9 are analyzed by the control microprocessor 8 and reconstructed as the data table transport packets (PAT', PMT', SIT) for constructing a new packet stream as described in further detail below. While the Event Information Table (EIT) contains information for the multiple programs multiplexed in the broadcast stream, the Selection Information Table (SIT) contains information for only the one selected program. The reconstructed data table transport packet is sent to the multiplexer 6, multiplexed with the AV transport packets encoded and generated by the AV encoder 5, and output to the storage controller 7 as an MPEG-TS packet stream. The storage controller 7 then records the received packet stream to the recording media 11.

The output from the demultiplexer 3 is also input to the storage controller 7, and the demultiplexer 3 output can thus be recorded straight to the recording media 11. The demultiplexer 3 could be controlled by the control microprocessor 8 to output only the one selected stream (a partial transport stream) from the multiple programs contained in the packet stream, or to output all of the streams (full transport stream) contained in the received packet stream. The transferred transport stream is buffered to the storage controller 7 and then recorded to the recording media 11. When recording by this channel, the control microprocessor 8 instructs the demultiplexer 3 to pass the signal without packet demultiplexing, or instructs the demultiplexer 3 to output only those packets relating to the specific program. The user can in this preselect via the user interface 12 whether to record the digital broadcast in its entirety as broadcast, or to first decode the signal and record the re-encoded signal.

Reconstructing the data table transport packets is described next.

Except for certain packets such as the PAT and NIT packets, a PID (Packet ID) identifying each packet is assigned to every packet in the demodulated digital broadcast packet stream. Multiple programs may be multiplexed in a single packet stream, and the PID is used to identify the packets. An example of this is shown in FIG. 2.

Figure 2:
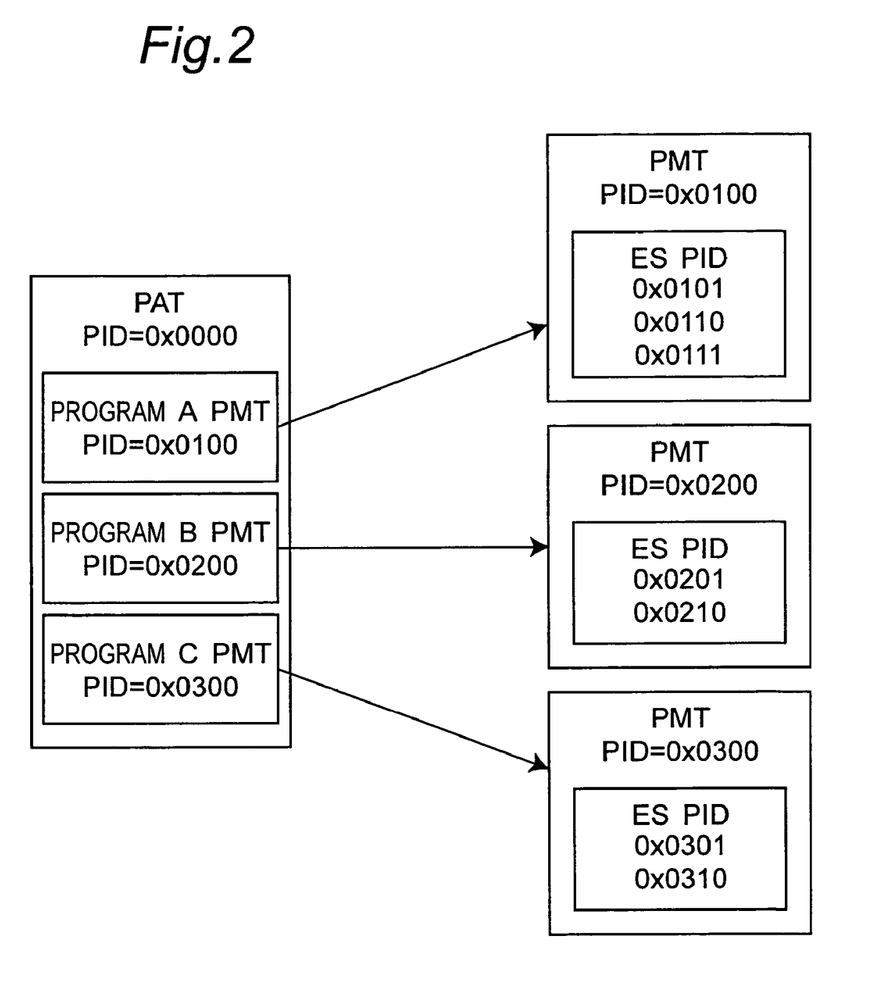
FIG. 2 describes the relationship between the Program Association Table and Program Map Table in the broadcast stream.

FIG. 2 shows the relationship between the Program Association Table and Program Map Table when a packet stream containing three programs A, B, C is output from the digital tuner 1. The PAT packet PID is fixed as 0x0000 in the MPEG-TS standard, but the PID of all other packets is assigned by the broadcast system. Furthermore, when a particular program is decoded and then re-encoded for recording, the program will not be multiplexed with other programs and the PIDs used during recording can be freely selected. An example of this situation is shown in FIG. 3.

Figure 3:
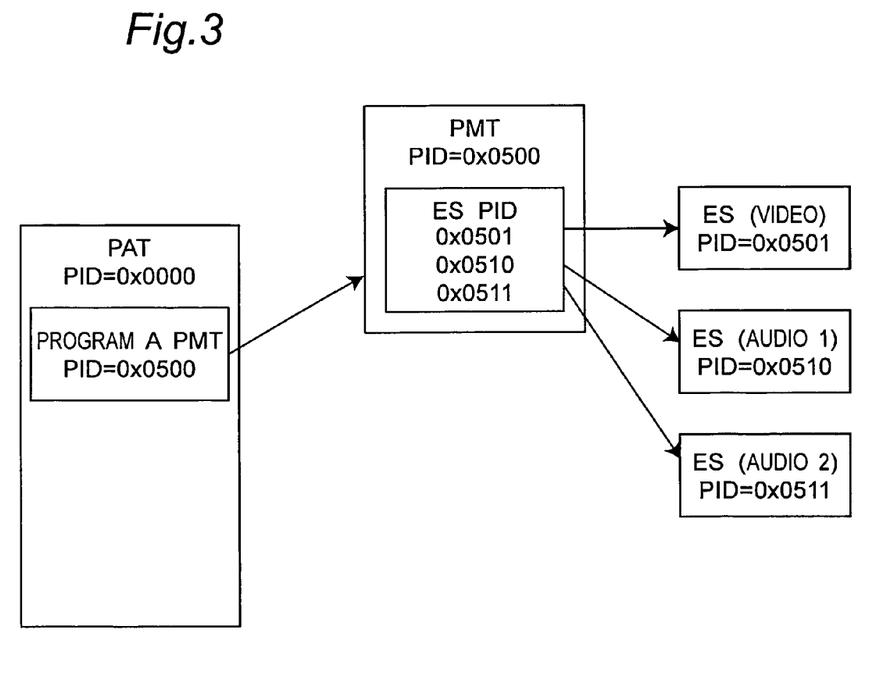
FIG. 3 shows the relationship between the Program Association Table and Program Map Table generated during the recording operation of the recording/playback apparatus shown in FIG. 1.

FIG. 3 shows the packets for recording program A selected from the multiplexed packet stream shown in FIG. 2. In this case the PID of the PMT packet is changed from 0x0100 to 0x0500, and the PIDs of the elementary stream (ES) of program A are changed. The PMT PID is changed by the control microprocessor 8, and the ES PIDs are changed by the AV encoder 5. Furthermore, if the PIDs of the PMT and ES packets are set to sequential values predetermined by the system, the PID values of the packets needed for decoding will be obvious, and analyzing the data table packets to extract the necessary PID values will be unnecessary.

In addition, the program information of the recorded stream and related control information is extracted from the program information and related control information for the recorded program in the packet stream demodulated from the digital broadcast, and constitutes the Selection Information Table (SIT) multiplexed after encoding. Descriptors for copy generation management control of copyrighted content, and parental rating information for parental control features, for example, are also included. The parental rating information contains the same content in the Conditional Access System descriptor in the PMT.

Figure 4:
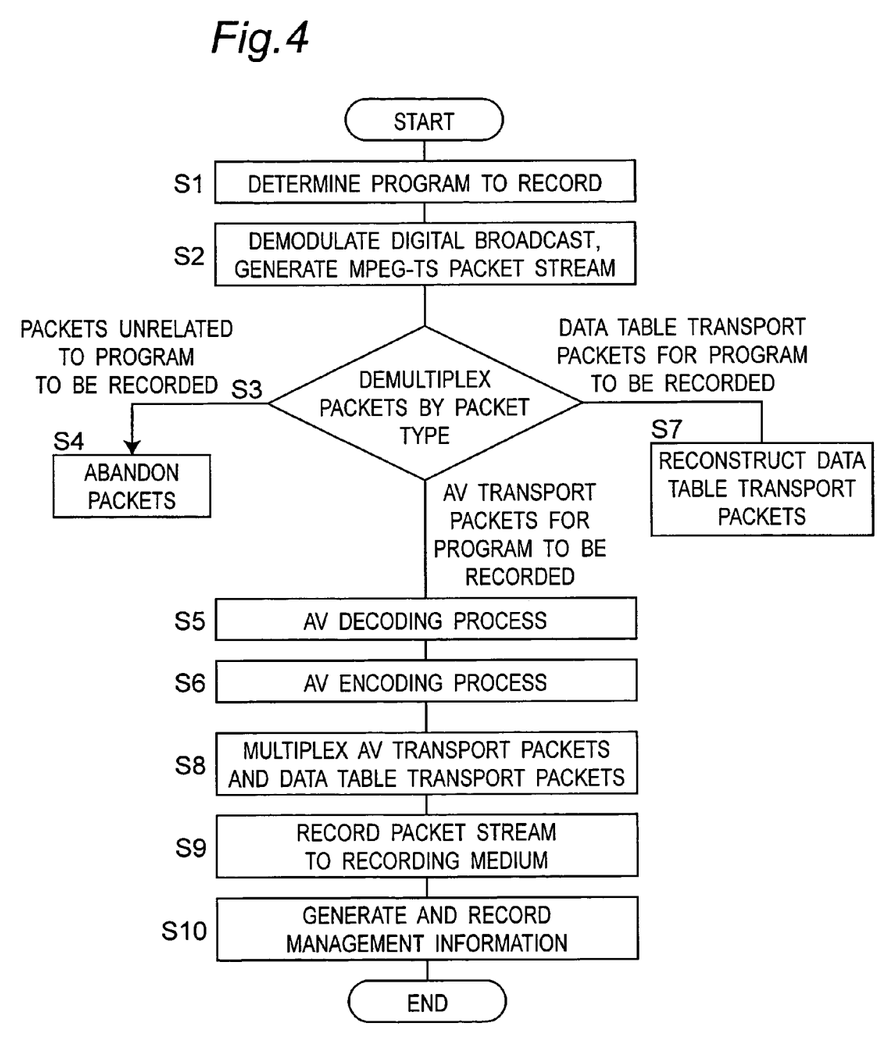
FIG. 4 is a flow chart of the recording operation of a recording/playback apparatus according a first embodiment of the invention.

FIG. 4 is a flow chart of the recording operation of the recording/playback apparatus according to this first embodiment of the invention. The first step when recording starts is determining the program to be recorded (S1). The tuner is then adjusted to the digital broadcast containing the program to be recorded, and the broadcast is demodulated to acquire the MPEG-TS packet stream (S2). The program packets are then identified and demultiplexed from the packet stream based on the PIDs (S3), and the packets that are unrelated to the recording program are abandoned (S4). The AV transport packets of the recording program are then AV decoded (S5), then re-encoded (S6) to generate the new AV transport packets. Recording efficiency can be improved at this time by dropping the video data resolution after AV decoding to reduce the data volume. The data table transport packets of the recording program are then reconstructed (S7) and multiplexed with the AV transport packets to generate the new MPEG-TS packet stream for recording (S8). The resulting packet stream is then recorded to the recording medium (S9). Management information for the recorded packet stream is also generated and recorded to the recording medium (S10). This ends the recording process.

FIG. 5 shows the structure of the data (second and third packet streams) recorded to the recording medium in the foregoing recording operation of a recording/playback apparatus according to this first embodiment of the invention.

Figure 5A:
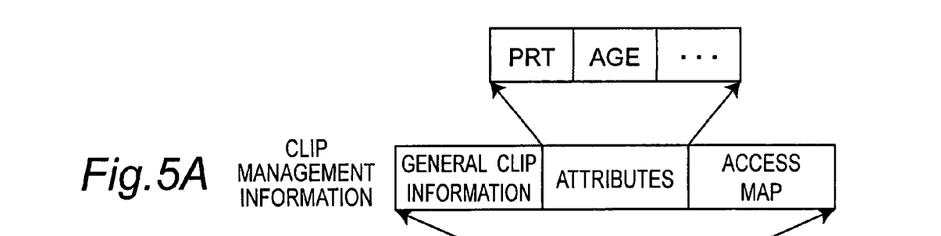
FIG. 5A to FIG. 5F show the recording data generated by the recording operation of a recording/playback apparatus according to a first embodiment of the invention.
Figure 5B:
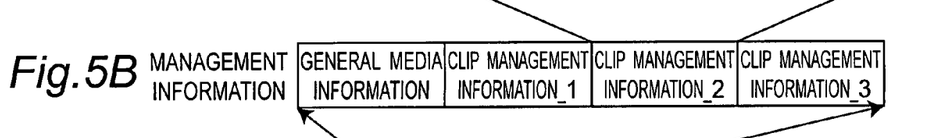
Figure 5C:
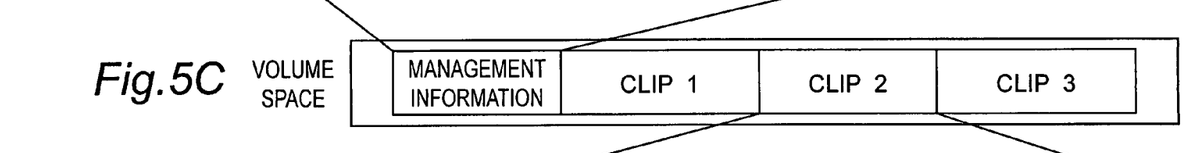

As shown in FIG. 5C, for program in the volume space, the volume space contains management information relating to the data in the volume, and the program recorded by the recording operation. Each recorded program is called a clip, and a unique number is assigned to each recording unit for managing the recording units.

FIG. 5B shows the management information in detail. The management information includes general media information recording information about the recording medium, and clip management information, which is management information for each recorded clip.

FIG. 5A shows the clip management information in detail. The clip management information includes general clip information, clip attribute information, and a clip access map. The general clip information contains such general information about the clip as the date and time when the clip was recorded, the clip size, and flags indicating if the clip was decoded and then re-encoded before recording, or whether the broadcast stream was recorded directly to media. The clip attributes include the video resolution of the clip and the audio encoding mode. The access map correlates the clip playback time to the recording medium addresses to enable randomly accessing desired locations within the clip.

If a parental rating descriptor is contained in the recorded program, the attributes also include parental rating information. Parental rating information includes the PRT flag denoting whether a parental rating descriptor is included, and an Age descriptor denoting the age restriction. If viewing is prohibited for viewers under the age of 15, this Age descriptor is set to "15," for example. The parental rating information could also contain only the PRT flag or the Age descriptor.

Figure 5D:
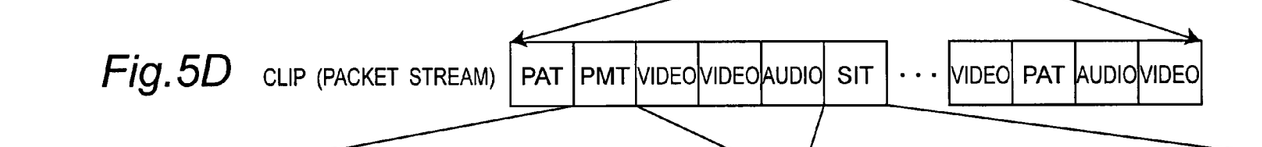

FIG. 5D shows a clip produced in the recording operation in detail. A clip is composed of multiple types of TS packets in the MPEG-TS packet stream, and each packet is identified by its PID. The PAT and PMT contain information for identifying the video and audio packets of each program, and the SIT packets containing the detailed program information.

Figure 5E:
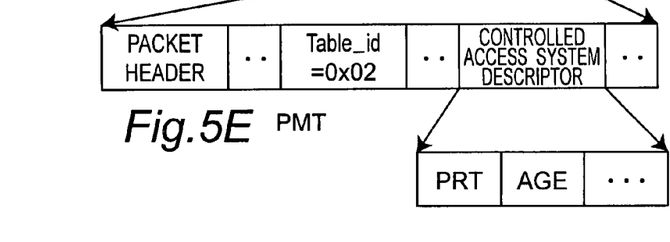

FIG. 5E shows the PMT in detail. When the program is subject to parental controls, the parental rating information described above is written to the Control Access System descriptor in the PMT.

Figure 5F:
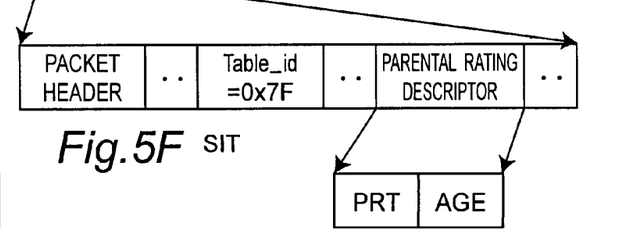

FIG. 5F shows the SIT in detail. Likewise when a program is subject to parental controls, the parental rating information described above is written to the parental rating descriptor in the SIT.

The parental control information is set to the same parental rating in both the PMT and SIT of the same program. When reconstructing the data table transport packets, the parental rating information can be inserted to the PAT packets, for example, in addition to the PMT and SIT packets. Note that it is only necessary to write the parental rating information to at least one data table transport packet.

The copy control information could also be written to the same location as the parental rating information.

A recording/playback apparatus according to this embodiment of the invention can thus save such program information as the parental rating information contained in the original broadcast even when a digital broadcast is decoded and then re-encoded for recording to the recording medium. This recording/playback apparatus can also increase the recording efficiency by lowering the resolution for re-encoding.

The playback operation of this first embodiment of a recording/playback apparatus according to the present invention is described next with reference to playing a program recorded by the foregoing recording operation.

The control microprocessor 8 first switches the selector switch 2 to the second input side to receive input from the storage controller 7. The control microprocessor 8 also functions as a program table data processor, thus generates a program table from the list of programs recorded to the recording media 11, and presents the program table on the monitor 10. Using the user interface 12, the user then selects and tells the control microprocessor 8 which program to play back.

The control microprocessor 8 then tells the storage controller 7 where to start reading from the recording media 11. The storage controller 7 thus reads data from the recording media 11 starting at the specified address, and outputs the packet stream. This packet stream is passed by the selector switch 2 to the demultiplexer 3. The demultiplexer 3 then extracts the AV transport packets (A, V) required for decoding by the AV decoder 4 from the packet stream. Because the PID values of the required packets were set during encoding prior to recording to predetermined sequential values, the packets that must be output to the AV decoder 4 can be immediately identified without interpreting the data table.

Figure 6:
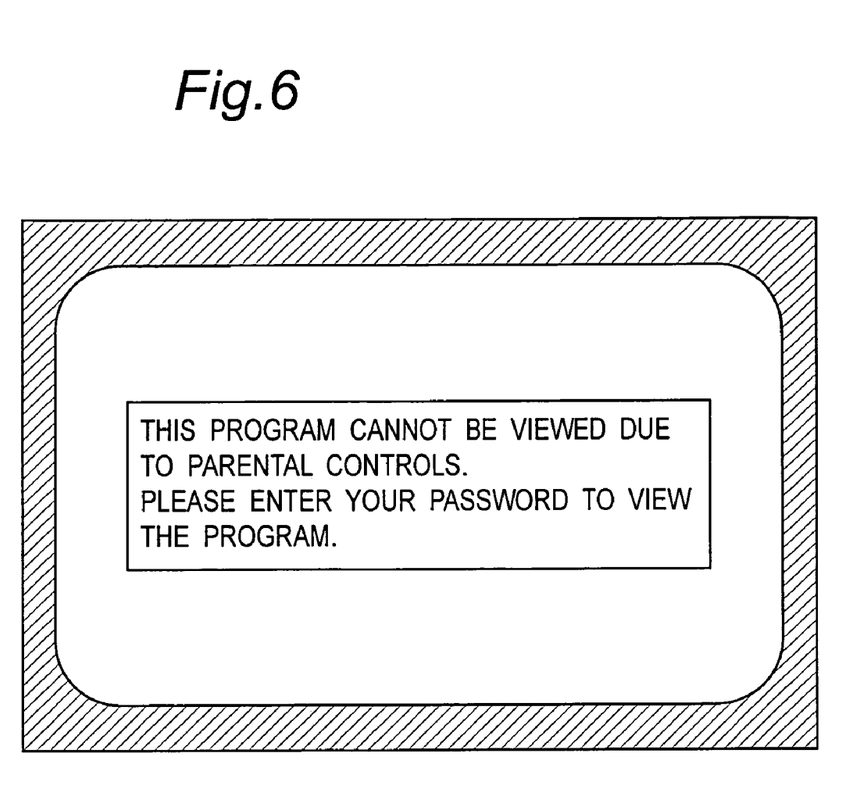
FIG. 6 shows exemplary screen prompts displayed when reproducing a program that cannot be viewed.

If parental controls are applied to the playback program, the control microprocessor 8 acquires the parental rating information by referencing the management information or data table packets demultiplexed from the AV transport packets by the demultiplexer 3. This parental rating (the "program_parental_rating" below) and the age specified by the user and preset by the parental control unit 13 (that is, the parental rating enabled for playback by the recording/playback apparatus, called the "playable_parental_rating" below) are then compared. If the program_parental_rating is higher than the playable_parental_rating, that is, if the viewing age of the rating is higher than the viewer age set in the recording/playback apparatus, playback is prohibited. The control microprocessor 8 therefore instructs the AV decoder 4 to stop playback. The control microprocessor 8 simultaneously displays a message on the screen to inform the viewer that the program cannot be viewed. As shown in FIG. 6, this message could, for example, say "This program cannot be viewed due to parental controls. Please enter your password to view the program."

To view the titles of the playback programs or see detailed information about the program, the user sends a view program content request to the control microprocessor 8 using the user interface 12. The control microprocessor 8 then extracts the program information from the data table packets demultiplexed from the AV transport packets by the demultiplexer 3, and displays the titles, program information, or other content requested by the user on the display. The control microprocessor 8 could automatically display this program information at the start of playback.

Figure 7:
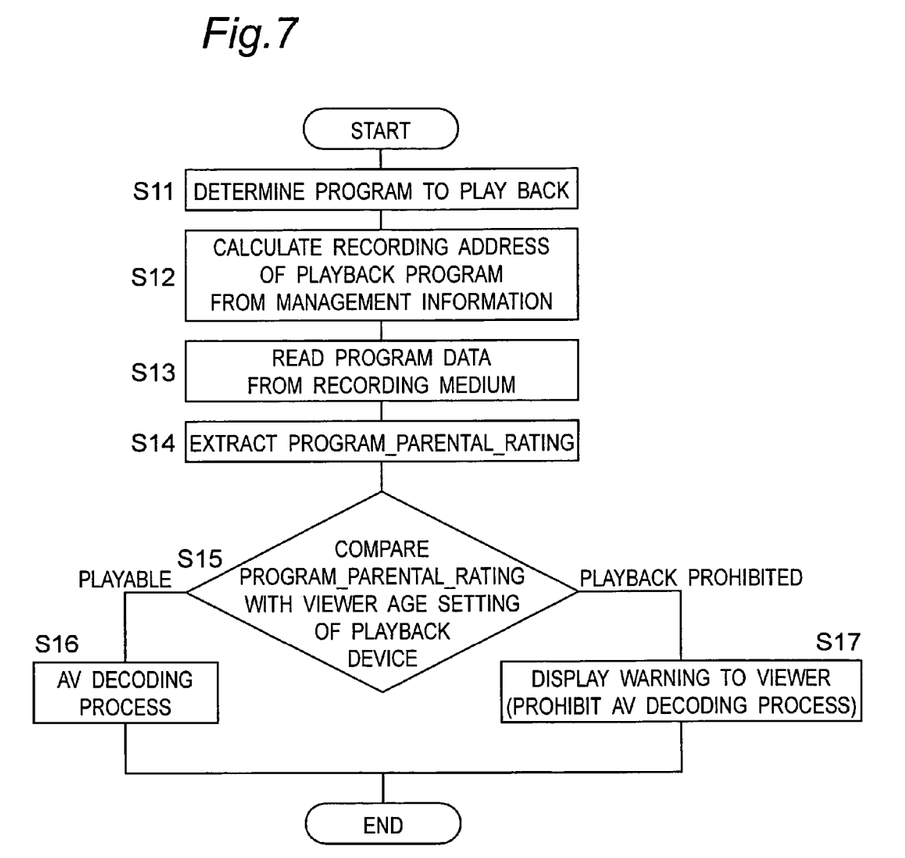
FIG. 7 is a flow chart of the playback operation of a recording/playback apparatus according a first embodiment of the invention.

FIG. 7 is a flow chart of the playback operation of this preferred embodiment of a recording/playback apparatus according to the present invention.

The first step at the start of playback is the user selecting and specifying which program recorded to the recording media is to be played (S11). The management information for the selected program (clip) recorded to the recording medium is then read to get the recording address of the selected playback program on the recording medium (S12). The program data is then read from the recording medium starting from this address (S13). The program_parental_rating, i.e., the parental control level set for the program, is then extracted from the program data (such as the PMT or SIT) or management information read from the recording medium (S14). This extracted program_parental_rating is then compared with the playable_parental_rating preset in the parental control unit 13 of the recording/playback apparatus (S15).

If the playable_parental_rating is equal to or greater than the program_parental_rating, playback is enabled, the AV decoding process runs (S16), and the user can view the program. However, if the program_parental_rating is higher than the playable_parental_rating, playback is disabled, an appropriate message is displayed for the user such as shown in FIG. 6, and the AV decoding process is prohibited (S17).

The recording/playback apparatus of the present invention can thus apply parental control conforming to the parental rating of the original broadcast even when playing back a digital broadcast program that was decoded, then re-encoded and recorded to a recording medium. Program content can also be referenced automatically or as requested by the user during playback.

It should be noted that both recording and playback are executed by the same apparatus in this preferred embodiment of the present invention, but the invention shall not be so limited. More specifically, if a playback-only device has a function comparable to the playback operation of this preferred embodiment of the invention, the recording/playback apparatus of this preferred embodiment could record to a removable recording medium, this removable recording medium could then be loaded in the playback-only device for playback in the same way as described above.

Furthermore, this playback-only device could be connected to the foregoing recording/playback apparatus by means of a digital interface such as IEEE-1394, and the playback stream could be sent over this digital interface to the playback-only device for playback in the same way as described above.

This invention can also be achieved by means of a computer program. This program can also be transferred from one computer to another computer via an electrical communication path, or recorded to CD-ROM or other recording medium and transferred to another computer, and the program can thus be executed on other computer systems.

INDUSTRIAL APPLICABILITY

A recording/playback apparatus according to the present invention can be used in data recording and playback fields.

The invention claimed is:

1. A recording and reproducing apparatus for recording a first packet stream containing first AV transport packets and first data table packets for managing the first AV transport packets, the recording and reproducing comprising:
    a demultiplexer for demultiplexing the first packet stream into the first AV transport packets and the first data table packets;
    a memory for storing the first data table packets, wherein the first data table packets contain parental control information;
    an AV decoder for decoding the AV transport packets and outputting AV data;
    an AV encoder for encoding the AV data and outputting second AV transport packets;
    a data table packet generator for constructing second data table packets, based on the first data table packets stored in memory, for managing the second AV transport packets; and
    a multiplexer for multiplexing the second AV transport packets and the second data table packets, and outputting the multiplexed second AV transport packets and second data table packets in a second packet stream;
    wherein the second data table packets contain parental control information.

2. A recording and reproducing apparatus as described in claim 1, further comprising:
    a digital tuner for receiving and demodulating digital broadcasts; and
    a storage controller for recording the first packet stream or the second packet stream;
    wherein the first packet stream or the second packet stream stored in the storage controller is input to the demultiplexer.

3. A recording and reproducing apparatus as described in claim 2, further comprising:
    a program table data processor for collecting program information from the first packet stream or the second packet stream and generating a program table; and
    a user interface unit for receiving user input;
    wherein the demultiplexer outputs the first AV transport packets and the first data table packets for a program selected from the user interface unit.

4. A recording and reproducing apparatus as described in claim 3, wherein the storage controller records the first packet stream or the second packet stream based on input from the user interface unit.

5. A recording and reproducing apparatus as described in claim 3, wherein the AV encoder determines the compression rate based on input from the user interface unit.

6. A recording and reproducing apparatus as described in claim 1, further comprising an age setting unit for setting a viewer age;
    wherein the age set by the age setting unit and the parental control information are compared, and
    an AV decoding process is run if the age set by the age setting unit is greater than or equal to the parental control information, and the AV decoding process is prohibited if not.

7. A recording and reproducing method for recording a packet stream containing first AV transport packets and first data table packets for managing the first AV transport packets, the recording and reproducing method comprising the steps of:
    demultiplexing the first packet stream into the first AV transport packets and the first data table packets;
    storing the first data table packets in a memory, wherein the first data table packets contain parental control information;
    decoding the first AV transport packets and outputting AV data;
    encoding the AV data and outputting second AV transport packets;

constructing second data table packets, based on the first data table packets, for managing the second AV transport packets; and multiplexing the second AV transport packets and the second data table packets, and outputting the multiplexed second AV transport packets and second data table packets in a second packet stream;

wherein the second data table packets contain parental control information.

8. A recording and reproducing method as described in claim 7, further comprising the steps of:

receiving and demodulating a digital broadcast; and determining a recording program to be recorded from the digital broadcast received in said determining step;

wherein said demultiplexing step comprises demultiplexing the first packet stream of the recording program determined to be recorded in said determining step into the first AV transport packets and the first data table packets.

9. A recording and reproducing method as described in claim 7, further comprising a step of setting, by an age setting unit, a viewer age;

wherein the age set by the age setting unit and the parental control information are compared, and an AV decoding process is run if the age set by the age setting unit is greater than or equal to the parental control information, and the AV decoding process is prohibited if not.

10. A non-transitory computer-readable recording medium recording a program for executing on a computer the steps described in claim 7.

11. A program for executing on a computer the steps described in claim 7.

12. A recording and reproducing apparatus as described in claim 1, wherein the AV data is an analog signal.

13. A recording and reproducing apparatus as described in claim 1, wherein the AV data is a baseband signal.

14. A recording and reproducing method as described in claim 8, further comprising the steps of:

collecting program information from the first packet stream or the second packet stream, and generating a program table; and receiving user input;

wherein said demultiplexing step comprises outputting the first AV transport packets and the first data table packets for a program selected by a user in said receiving user input step.

15. A recording and reproducing method as described in claim 14, wherein said determining step comprises determining a recording program of either the first packet stream or the second packet stream based on the program selected by the user in said receiving user input step.

16. A recording and reproducing method as described in claim 8, wherein said encoding step comprises determining the compression rate based on input from the user in said receiving user input step.

17. A recording and reproducing method as described in claim 7, wherein the AV data is an analog signal.

18. A recording and reproducing method as described in claim 7, wherein the AV data is baseband signal.

* * * * *